United States Patent
Takayanagi

[19]

[11] Patent Number: 6,155,663
[45] Date of Patent: *Dec. 5, 2000

[54] IMAGE RECORDING METHOD AND APPARATUS

[75] Inventor: Yoshiaki Takayanagi, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/515,214

[22] Filed: Aug. 15, 1995

[30] Foreign Application Priority Data

Aug. 24, 1994 [JP] Japan .................................. 6-199827

[51] Int. Cl.⁷ ........................................................ B41J 29/38
[52] U.S. Cl. ................................................ 347/5; 347/40
[58] Field of Search .................................. 347/5, 12, 14, 347/37, 40

[56] References Cited

U.S. PATENT DOCUMENTS

| | | | |
|---|---|---|---|
| 4,525,726 | 6/1985 | Mori | 346/75 |
| 4,653,940 | 3/1987 | Katsukawa | 400/121 |
| 4,860,034 | 8/1989 | Watanabe et al. | 346/140 R |
| 4,967,203 | 10/1990 | Doan et al. | 346/1.1 |
| 5,217,310 | 6/1993 | Watanabe | 400/124 |
| 5,327,166 | 7/1994 | Shimada | 346/76 PH |
| 5,373,368 | 12/1994 | Taniguro | 358/296 |
| 5,412,406 | 5/1995 | Fujimoto | 347/180 |
| 5,594,478 | 1/1997 | Matsubara et al. | 347/41 |

FOREIGN PATENT DOCUMENTS

| | | |
|---|---|---|
| 0138493 | 4/1985 | European Pat. Off. . |
| 0262506 | 4/1988 | European Pat. Off. . |
| 0318328 | 5/1989 | European Pat. Off. . |
| 0478369 | 4/1992 | European Pat. Off. . |
| 0518670 | 12/1992 | European Pat. Off. . |
| 0535294 | 4/1993 | European Pat. Off. . |
| 0602975 | 6/1994 | European Pat. Off. . |
| 55-119784 | 9/1980 | Japan . |
| 63-42874 | 2/1988 | Japan . |
| 3164266 | 7/1991 | Japan . |
| 4353466 | 12/1992 | Japan . |
| 6143648 | 5/1994 | Japan . |

*Primary Examiner*—Russell Adams
*Assistant Examiner*—Christoper Mahoney
*Attorney, Agent, or Firm*—Fitzpatrick, Cella, Harper & Scinto

[57] ABSTRACT

This invention relates to an image recording method and apparatus which can attain a reduction in power in using an elongated recording head for a high-speed print operation. An image recording method according to an embodiment of the invention has the following steps. The effective dots in a plurality of print buffers are counted. The effective pixel ratio of an image to be recorded from each of the print buffers is obtained from each count value. A print mode is determined on the basis of each effective pixel ratio. The print modes include a mode of simultaneously recording the contents of a plurality of print buffers, and a mode of independently printing the contents of the respective print buffers.

24 Claims, 13 Drawing Sheets

EMULATION MODE (X24E SYSTEM)

FIG. 10

⊛ DRAWING AREA 1 : DENSITY FLAG REGISTER = 00011101011000000B

⊛ DRAWING AREA 2 : DENSITY FLAG REGISTER = 01011100001100000B

———————————————————

OR : 01011101011100000B

IMAGE RECORDING METHOD AND APPARATUS

BACKGROUND OF THE INVENTION

1. Field of the Invention

The present invention relates to an image recording method and apparatus and, more particularly, to an image recording method and apparatus which can perform a low-power, high-speed print operation using a recording head having a plurality of recording elements.

2. Description of the Related Art

As conventional serial printers, thermal transfer printers, ink-jet printers, and the like are available. Such an apparatus has a plurality of recording element arrays. These recording element arrays are arranged parallel to the convey direction of a recording sheet. A print operation for one recording sheet is completed by the fact that the recording element arrays sequentially scan in a direction perpendicular to the convey direction.

Recently, in order to achieve high print speed, the number of recording elements included in the above recording element arrays (the length of the recording head) has greatly increased.

This tendency toward the elongation of the recording head raises problems of increases in the capacity, size, and cost of a power supply, and the like.

With regard to a power supply for driving a printer, compact, high-efficiency, high-power switching power supplies have been widely used with advances in switching regulator techniques. Such power supplies, however, are more expensive than power adaptors of the conventional transformer scheme. Note that these power supplies can be classified into the type of power supplies which are incorporated in printers and adaptor-type of power supplies which are independent of printers.

The demand for the above power supply to have higher power is based on an increase in power required for a recording operation with the elongation of a recording head. More specifically, as the number of recording elements increases, the number of recording elements to be driven per unit time increases. When, for example, an image having an average density Z [%] is to be recorded by an ink-jet recording head having n nozzles with a discharge frequency f [Hz] and a drive pulse width T [sec], a required power Pn is given by:

$$Pn = (I \cdot V \cdot n) \cdot (T \cdot f) \cdot Z \qquad (1)$$

where I is the peak value of a rectangular pulse current flowing in each recording element, and V is the power supply voltage value.

As is apparent from equation (1), according to an increase in the number of nozzles n, the discharge frequency f, and/or the average density Z, the power Pn increases.

In order to realize a high-speed print operation by increasing the number of nozzles with lower power, the value of each parameter must be decreased. However, the parameter Z is a value unique to an image, and a decrease in the value of the parameter f leads to a decrease in print speed. Therefore, it is not preferable that the values of these parameter be decreased.

SUMMARY OF THE INVENTION

Accordingly, an object of the present invention is to obtain an image recording method and apparatus which can achieve a decrease in the power of a power supply and an increase in print speed in using a recording head having a plurality of recording elements.

The foregoing object is attained by the apparatus and method thereof according to the present invention described below.

One embodiment of the present invention is directed to an image recording apparatus for recording an image by sequentially scanning a recording head having a plurality of recording elements in a direction different from a convey direction of a recording sheet. The apparatus includes count means for counting data to be actually printed in print data corresponding to each divided area obtained by dividing an area, in which data is printed by scanning said recording head, in a predetermined unit; and selection means for selecting a recording mode corresponding to the predetermined recording area from a plurality of recording modes on the basis of a print duty according to a count value, in each divided area, which is obtained by said count means.

Another embodiment of the present invention is directed to an image recording method of recording an image by sequentially scanning a recording head having a plurality of recording elements in a direction different from a convey direction of a recording sheet. The apparatus includes a count step of counting data to be actually printed in print data corresponding to each divided area obtained by dividing a predetermined recording area in a predetermined unit; and a selection step of selecting a recording mode corresponding to the predetermined recording area on the basis of a print duty according to the count value, in each divided area, which is obtained in the count step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view showing an example of OR processing in the density flag register in FIG. 9;

DETAILED DESCRIPTION OF THE PREFERRED EMBODIMENTS

Preferred embodiments of the present invention will be described in detail in accordance with the accompanying drawings.

The main points of a recording apparatus according to an embodiment of the present invention will be briefly described below.

The recording apparatus of this embodiment has a plurality of print modes for recording in a predetermined recording area corresponding to the effective recording width of the recording head by a single scanning operation or a plurality of scanning operations. Effective pixels in a plurality of print buffers corresponding to areas obtained by dividing the effective recording width of the recording head, which are counted before a print operation, and an effective pixel ratio (print duty) of the number of the effective pixels to the total number of pixels in each buffer is obtained. One of the print modes is then selected on the basis of the effective pixel ratio or a corresponding value or code which has the same meaning as the ratio.

In still another embodiment of the present invention, a plurality of print buffers corresponding to areas obtained by dividing the effective recording width of the recording head are prepared, and each print buffer is divided into a plurality of blocks in the scanning direction of the recording head. One of the print modes is then selected on the basis of the result obtained by performing a predetermined arithmetic or logic operation with respect to the effective pixel ratios (or corresponding values or codes) in the respective blocks in the plurality of buffers whose contents can be simultaneously recorded.

An embodiment of the present invention will be described in detail below.

Figure 1:
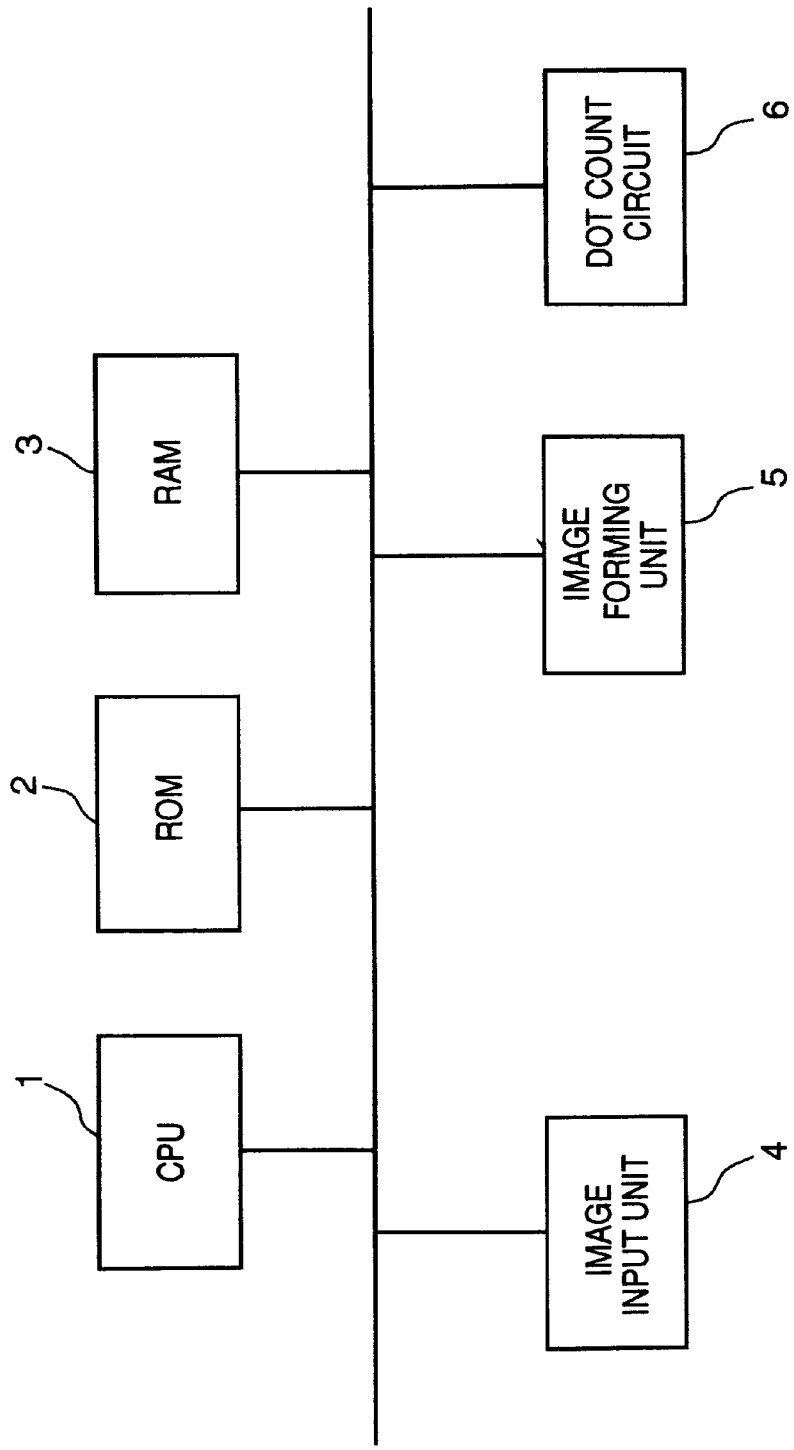
FIG. 1 is a block diagram showing the schematic arrangement of an image recording apparatus according to an embodiment of the present invention.

FIG. 1 shows the schematic arrangement of an image recording apparatus of this embodiment. Reference numeral 1 denotes a CPU for controlling the overall image recording apparatus; and 2, a ROM storing an image recording processing program and the like which are executed by the CPU 1. Programs corresponding to the respective processing flow charts to be described later are stored in the ROM 2. Reference numeral 3 denotes a RAM used as a working area for executing the above programs or as print buffers; 4, an image input unit capable of inputting an image from an external computer or reading an image through a built-in scanner (not shown); and 5, an image forming unit for receiving image data from a print buffer area in the RAM 3 to form an image. A dot count circuit 6 counts effective dots which result in power sumption.

Figure 2:
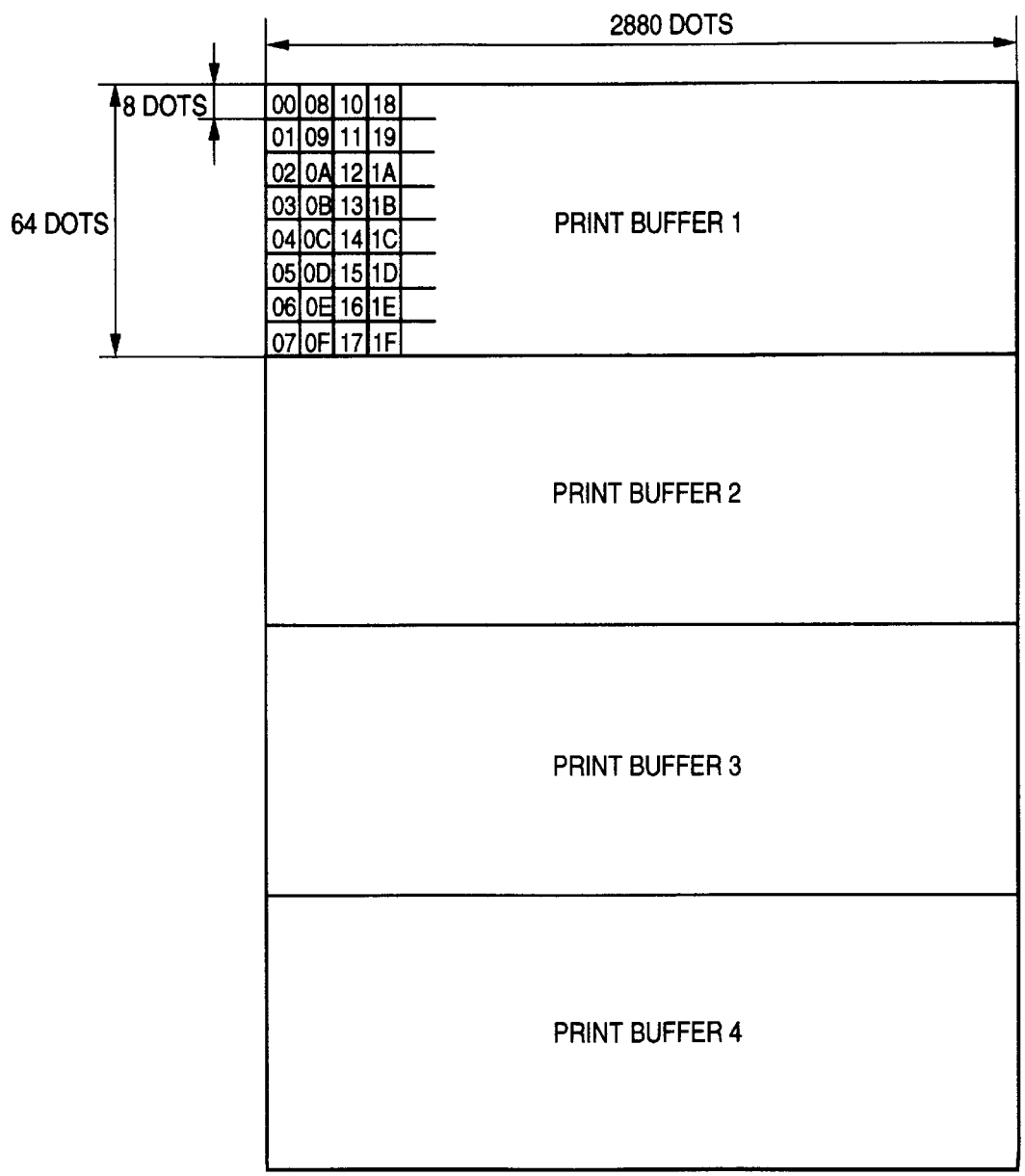
FIG. 2 is a view showing the arrangement of a print buffer of the recording apparatus of the embodiment.

FIG. 2 shows the arrangement of print buffers in the recording apparatus of the embodiment.

Figure 3:
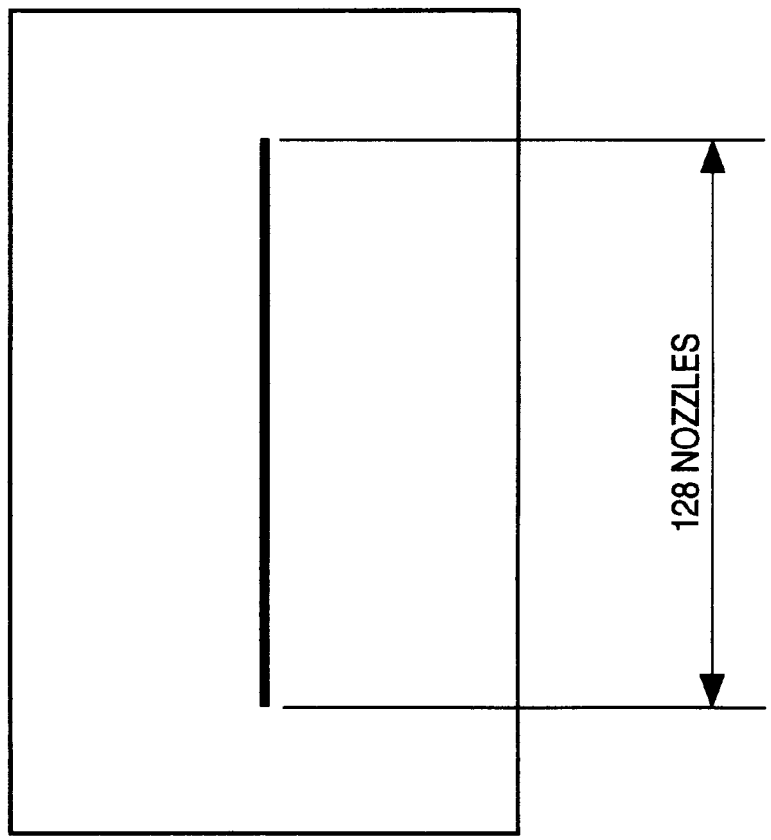
FIG. 3 is a view showing a recording head used in the embodiment.

The recording apparatus of the embodiment uses a 360-dpi (dot per inch) ink-jet recording head shown in FIG. 3 having 128 nozzles. In this embodiment, the recording head is of the type designed to change the state of an ink by using thermal energy so as to discharge an ink droplet from each nozzle. Owing to the characteristics of conventional serial printers, data is transferred from a host computer in units of data corresponding to one line of a text. For this reason, as shown in FIG. 2, the print buffer arrangement is based on a band arrangement having a width of 64 dots.

Figure 4:
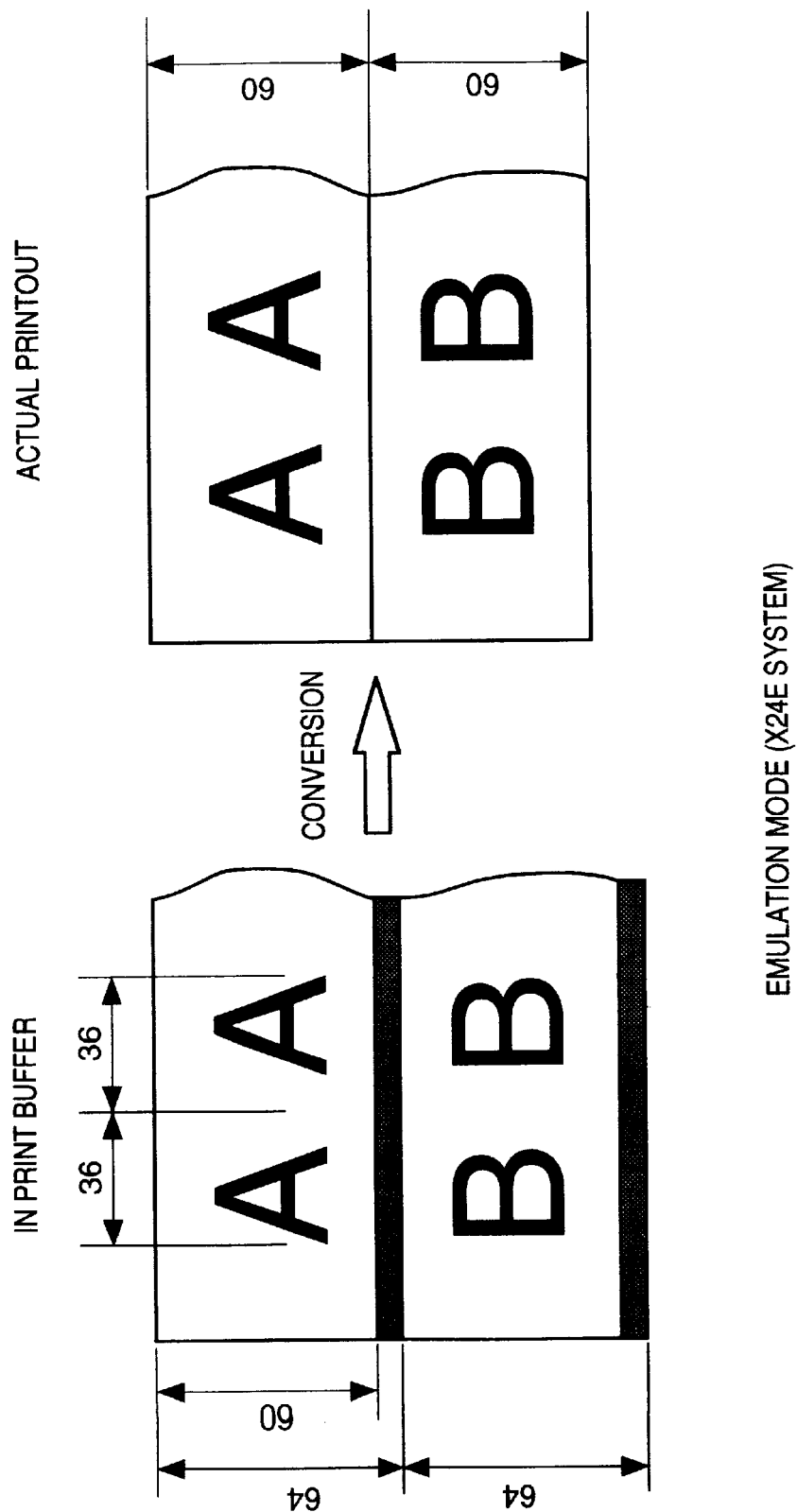
FIG. 4 is a view showing how characters to be actually printed are stored in the print buffer in FIG. 2.

More specifically, as shown in FIG. 4, for example, in the emulation mode of the X24E system, when a printer having a resolution of 360 dpi is used, a maximum of 80 typical characters each having a width of 36 dots and a height of 60 dots are stored in the print buffer in correspondence with a A4 recording sheet. That is, the effective dot count in the lateral direction is 2,880 (36×80) (see FIG. 2). When the contents of this print buffer are to be actually printed, each area indicated by the gray portion (see the left part of FIG. 4), i.e., each 4-dot area, in the print buffer must be omitted, as indicated by the right part of FIG. 4. Conversion from the left part into the right part of FIG. 4 is performed by dedicated hardware or software. Since this technique is not directly associated with this embodiment of the present invention, a detailed description thereof is omitted.

Referring back to FIG. 2, each print buffer has a width of 64 dots, and the 64 dots are divided into 8-dot areas. That is, eight dots correspond to 1-byte data. Each number in FIG. 2 indicates the lower eight bits of a byte address, and the address increases toward the right end of each buffer. Print buffer 1 includes 23,040 bytes (8×2,880 bytes). This applies to printer buffer 2, printer buffer 3, and printer buffer 4.

In this embodiment, as shown in FIG. 2, four print buffers are used in such a manner that the contents of print buffers 1 and 2 are simultaneously printed, and the contents of print buffers 3 and 4 are simultaneously printed. That is, each buffer corresponds to areas obtained by dividing the effective recording width of the recording head into two equal parts. With the use of the four buffers, while the contents of print buffers 1 and 2 are printed, contents to be printed next are stored in print buffers 3 and 4. Similarly, while the contents of print buffers 3 and 4 are printed, contents to be printed next are stored in print buffers 1 and 2.

The recording apparatus of this embodiment uses the recording head shown in FIG. 3, which has 128 nozzles. This head is driven with a power supply voltage of 24 V, a pulse current of 200 mA, a frequency of 6.25 kHz, and a drive pulse width of 5 $\mu$sec. In this case, when a solid black print operation is performed, the power consumption of the head is about 23 W according to equation (1). In addition, if, for example, an efficiency $\eta$ of a DC-DC converter, a switching regulator, or the like for generating a head voltage with high precision is 80%, the power actually consumed is about 29 W in terms of an input from the power supply.

In addition, in an ink-jet printer used in an embodiment of the present invention, a power supply (generally 5 V) for the logic, a power supply (which may be commonly used as a head drive power supply) for a motor for feeding a paper sheet and a motor for driving the recording head carriage, and the like are required. That is, a total power of 35 to 40 W is required for the power supply. If such power is to be provided through a power supply such as an inexpensive power adaptor, the power adaptor will increase in size and weight, and hence is not suitable for practical use.

For this reason, such a power supply is generally realized by using a switching regulator such as an adaptor of the switching scheme. Although this switching regulator is small in size, an increase in cost is inevitable. In this embodiment, therefore, the print mode is determined by counting black dots to realize an operation with a power supply having a low power, as will be described below.

Figure 5:
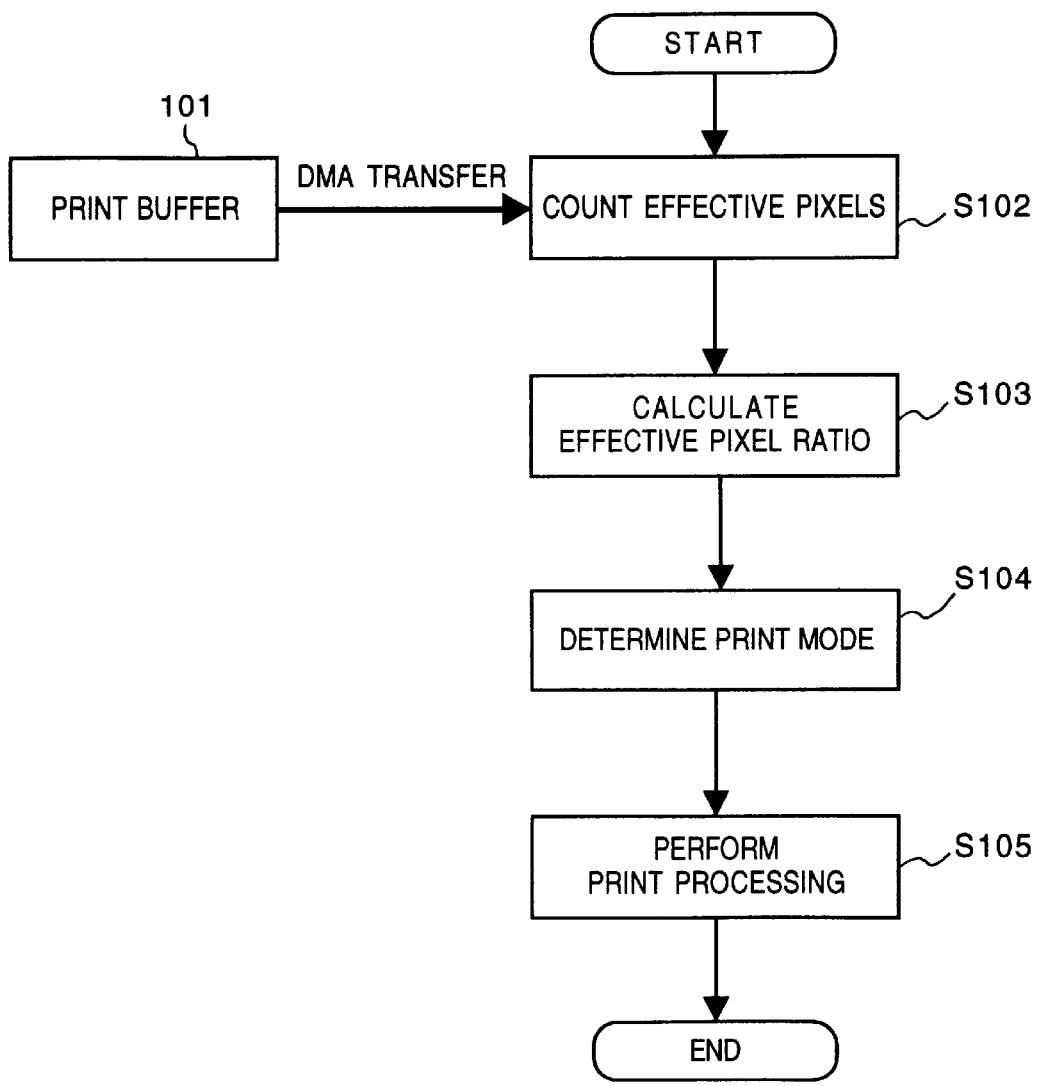
FIG. 5 is a flow chart showing an overall print control procedure in the embodiment.

This embodiment will be described next with reference to the flow chart of FIG. 5, which shows a control processing procedure in the recording apparatus of the embodiment.

In step S102, before the contents of print buffers (101 in FIGS. 2 and 5) are printed, the print dots, i.e., the black dots to be recorded, in a print buffer 101 are counted. This operation is performed by transferring the data in the print buffer 101 to a dot count circuit 6 according to for example the DMA transfer scheme. The DMA transfer is controlled by a DMA control unit embodied in CPU 1.

In step S103, the average density, i.e., the effective pixel ratio, of an image to be recorded from the print buffer is obtained from the count value.

In step S104, a print mode (recording mode) is determined on the basis of the effective pixel ratio obtained in this manner.

If, for example, the effective pixel ratio of both print buffers 1 and 2 is lower than a predetermined value, it is determined that the print duty is low, and the contents of print buffers 1 and 2 are simultaneously printed. If, however, the effective pixel ratio of one of print buffers 1 and 2 is higher than the predetermined value, it is determined that the print duties are high, the contents of the respective print buffers are non-simultaneously printed.

For example, the contents of print buffer 1 are recorded by the first scanning operation, and the contents of print buffer 2 are recorded by the second scanning operation.

Figure 6:
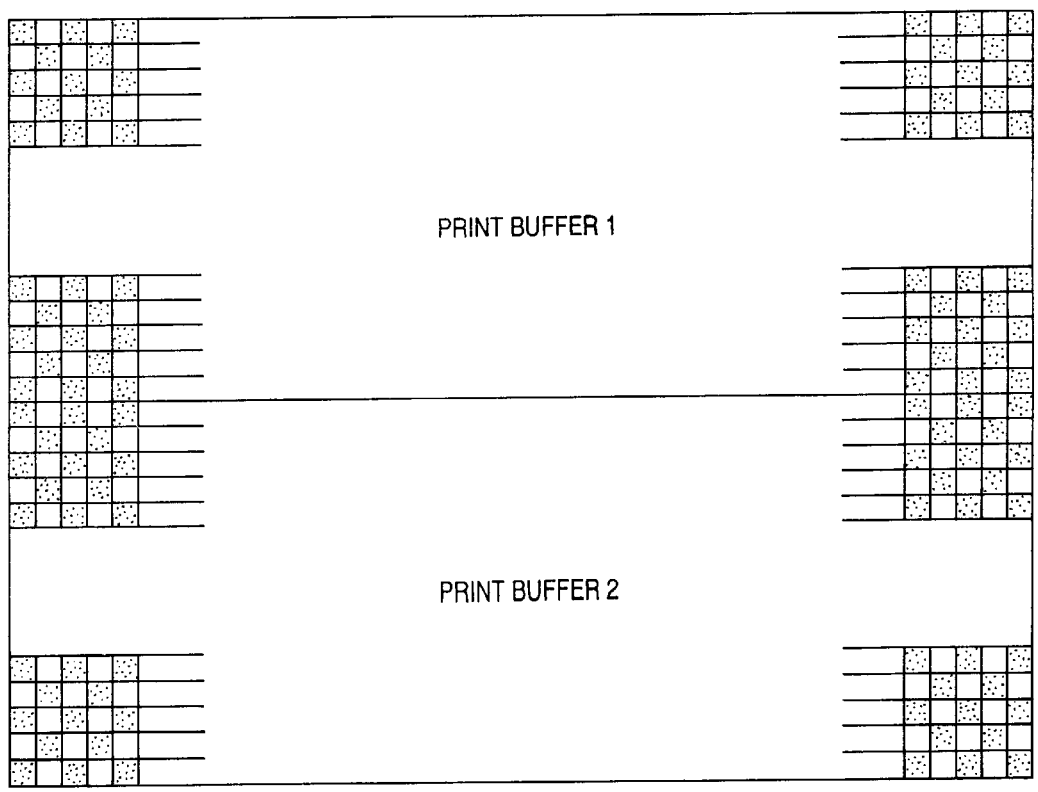
FIG. 6 is a view for explaining an embodiment of the print method of the present invention.

Alternatively, as shown in FIG. 6, the contents of print buffers 1 and 2 may be recorded by two scanning operations in a staggered form.

Referring to FIG. 6, for example, dots corresponding to the locations indicated in black are recorded by the first scanning operation, and dots corresponding to the locations indicated in white are recorded by the second scanning operation. Printer buffers 3 and 4 are controlled in the same manner.

Figure 7:
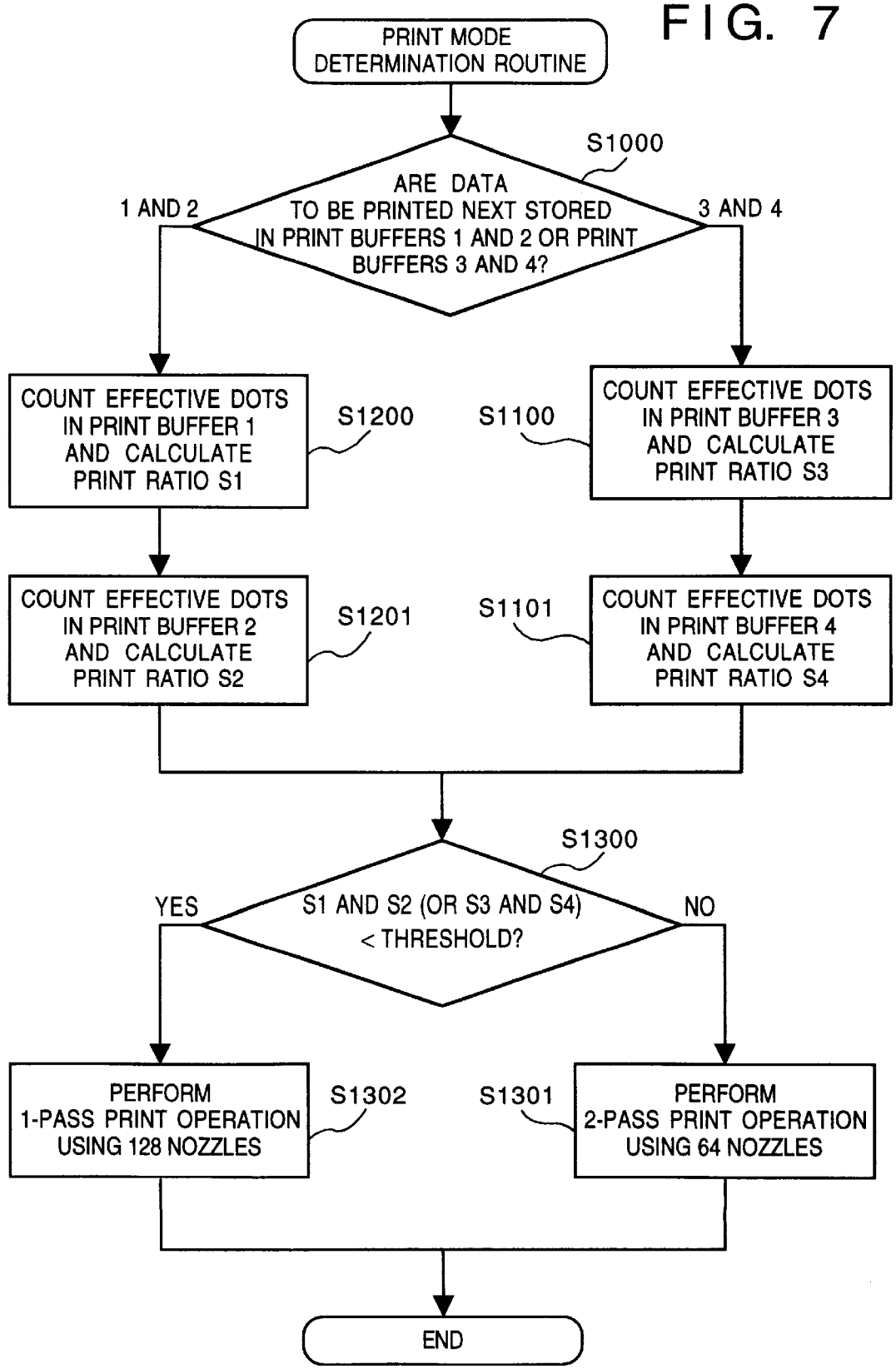
FIG. 7 is a flow chart showing print control in an embodiment of the present invention.

FIG. 7 shows a detailed flow chart associated with step S104 in FIG. 5, which will be described later.

In step S105, an image is formed in accordance with the print mode (recording mode) set in step S104.

The processing procedure in step S104 of FIG. 5 will be described in detail below with reference to FIG. 7.

Assume that the respective variable identifiers (S1, S2, S3, S4, . . . ) used in the following description are assigned to a local area in the RAM 3 in advance.

In step S1000, it is checked whether the locations of image data to be printed next are print buffers 1 and 2 or print buffers 3 and 4. If the locations are print buffers 1 and 2, the flow advances to step S1200. If the locations are print buffers 3 and 4, the flow advances to step S1100.

In step S1100, the print dots of the image data stored in print buffer 3 are counted, and a print ratio S3 is calculated.

In step S1101, the effective dots of the image data stored in print buffer 4 are counted, and a print ratio S4 is calculated.

In step S1200, the effective dots of the image data stored in print buffer 1 are counted, and a print ratio S1 is calculated.

In step S1201, the effective dots of the image data stored in print buffer 2 are counted, and a print ratio S2 is calculated.

In step S1300, if control is transferred from step S1201, the print ratios S1 and S2 are compared with a predetermined threshold. If the ratios are lower than the predetermined threshold, the flow advances to step S1302 to perform a 1-pass print operation using the 128 nozzles. If control is transferred from step S1101, the print ratios S3 and S4 are compared with a predetermined threshold. If the ratios are greater than the predetermined threshold, the flow advances to step S1301 to perform a 2-pass print operation using the 64 nozzles.

As described above, in the above method, when an image having a high effective pixel ratio, e.g., a graphic or pictorial image, is to be recorded, a recording operation is performed by using a half portion of the elongated recording head, i.e., the 64 nozzles, in correspondence with one scanning operation. For this reason, the average power consumption of the recording head is reduced to a half.

In contrast to this, when an image having a low effective pixel ratio, e.g., a text, is to be recorded, a recording operation is performed by using all the nozzles, i.e., the 128 nozzles. For this reason, a high-speed print operation can be realized.

In addition, in this embodiment, before the contents of a print buffer are recorded, the effective pixel ratio is determined. For this reason, even if a recording operation for one paper sheet includes a low-density text print operation and a high-density graphic print operation, the use of the 128 nozzles and the use of the 64 nozzles can be flexibly selected in accordance with the respective print operations.

(Second Embodiment)

Figure 8:
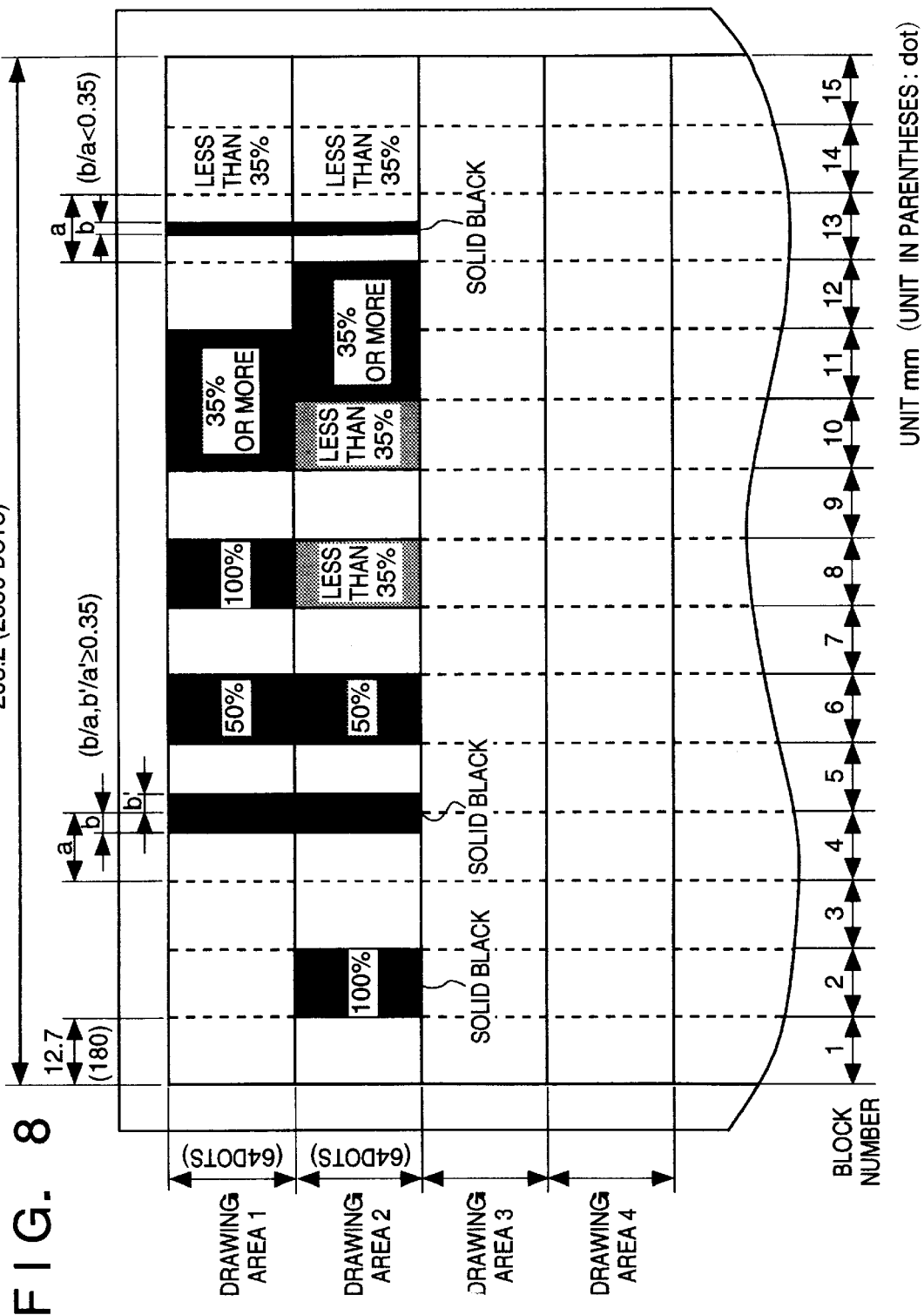
FIG. 8 is a view showing the concept of a print operation on a recording medium.

FIG. 8 shows the second embodiment of the present invention. In the second embodiment, one print buffer shown in FIG. 2 is divided into a plurality of blocks in the scanning direction of the recording head.

FIG. 8 shows the concept of a print operation on a recording medium. Referring to FIG. 8, an effective print area having a width of 2,880 dots is assigned to a recording medium in the direction of abscissa. This effective print area is divided into 16 areas, and block numbers 1 to 16 are assigned to the respective effective print areas. One effective print area is defined as a 180-dot area. Four drawing areas 1 to 4 are set in the direction of abscissa of the recording medium. Print buffers 1 to 4 in FIG. 1 correspond to the respective drawing areas. A plurality of types of print operations are indicated in the respective blocks in drawing areas 1 and 2. A symbol "%" indicates the effective pixel ratio of each block, i.e., the ratio of the number of dots to be actually recorded to the total number of dots included in each block described above. For example, the block number 2 in drawing area 2 is indicated as a block which is entirely subjected to a solid black print operation. The effective pixel ratio of this block is 100%. Each block number 6 in drawing areas 1 and 2 is indicated as a block having an effective pixel ratio of 50% and subjected to a halftone print operation. In addition, each block number 11 in drawing areas 1 and 2 is indicated as a block in which the ratio of a solid black print area to the total area of the block is 35% or less.

Figure 9:
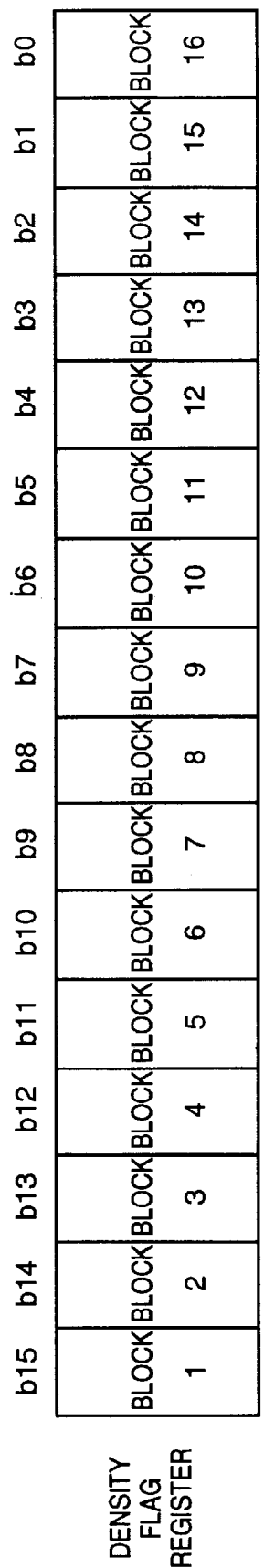
FIG. 9 is a view showing a density flag register in the second embodiment of the present invention.

FIG. 9 shows a density flag register storing results obtained by normalizing the effective pixel ratio in the 16 blocks in each drawing area in FIG. 8 with digital values of 0 and 1. For example, normalization is performed such that an effective pixel ratio of 35% or more is set to be "1"; and an effective pixel ratio of less than 35%, "0". In addition, bit 15 of this density flag register corresponds to block 1, and bit 0 corresponds to block 16.

FIG. 10 shows the contents of the density flag register which correspond to drawing areas 1 and 2. For example, since each of the blocks of block numbers 1 to 3 in drawing area 1 has an effective pixel ratio of 0%, bit 15 to bit 13 are "0". Since each of blocks 4 and 5 is indicated as a block having an effective pixel ratio of 35% or more, bits 12 and 11 are "1". Similarly, the contents of the density flag register are correlated to the respective bits up to bit 0.

In drawing area 2, the contents of the density flag register are correlated with the respective bits as in the case of drawing area 1.

Although the cases of drawing areas 3 and 4 are not illustrated, the bits in these areas are subjected to the same processing as that in the cases of drawing areas 1 and 2.

Subsequently, the OR between the result in the density flag register which corresponds to drawing area 1 and the result in the density flag register which corresponds to drawing area 2 is calculated. FIG. 10 shows the calculation result. The OR result corresponding to the case shown in FIG. 8 indicates that all the bits are not "0". This means that a block having an effective pixel ratio of 35% is present in one of drawing areas 1 and 2. That is, it is determined that the print duty is high.

According to this embodiment, in such a case, drawing areas 1 and 2 are printed by two scanning operations. That is, as described in the first embodiment, a print operation corresponding to drawing area 1 is executed by the first scanning operation, and a print operation corresponding to drawing area 2 is executed by the second scanning operation. Alternatively, the dots corresponding to the black portions of the staggered pattern shown in FIG. 3 are printed by the first scanning operation, and the dots corresponding to the white portions are printed by the second scanning operation.

Drawing areas 3 and 4 are processed in the same manner as in the case of drawing areas 1 and 2.

Figure 11:
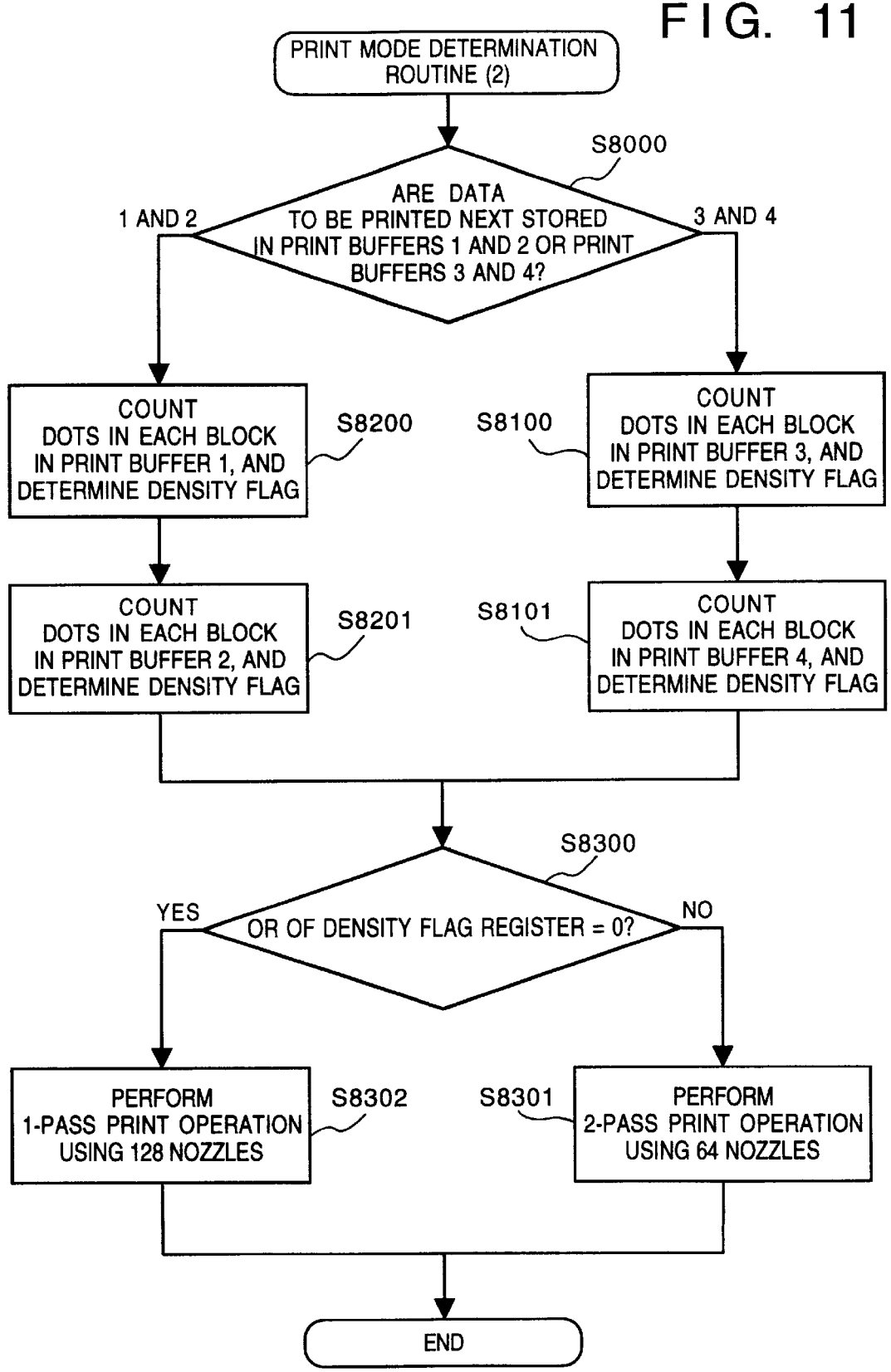
FIG. 11 is a flow chart showing an overall print control procedure in the embodiment.

FIG. 11 is a flow chart showing the above processing.

The detailed processing procedure in step 104 in FIG. 5 will be described next with reference to FIG. 11.

In step S8000, it is checked whether image data to be printed next are stored in print buffers 1 and 2 or print buffers 3 and 4. If the data are stored in print buffers 1 and 2, the flow advances to step S8200. If the data are stored in print buffers 3 and 4, the flow advances to step S8100.

In step S8100, dots in each block in print buffer 3 are counted, and a density flag is calculated and set.

In step S8101, dots in each block in print buffer 4 are counted, and a density flag is calculated and set.

In step S8200, dots in each block in print buffer 1 are counted, and a density flag is calculated and set.

In step S8201, dots in each block in print buffer 2 are counted, and a density flag is calculated and set.

In step S8300, it is checked whether the OR in the density flag register is "0". If the OR is "0", the flow advances to step S8302 to perform a 1-pass print operation using the 128 nozzles. If the OR is not "0", the flow advances to step S8301 to perform a 2-pass print operation using the 64 nozzles.

As described above, according to this embodiment, determination of the power consumption in a local area in each drawing area can be performed, and the peak power consumption of the power supply can be decreased by selecting optimal nozzles and an optimal print processing method. Since the target peak supply power can be decreased in designing a power supply, a reduction in the size and cost of the power supply can be realized.

In the above embodiments, the recording head has 128 nozzles, and a maximum of two print buffers whose contents can be simultaneously recorded. As is easily understood by those who are skilled in the art, the embodiments of the present invention can also be applied to a longer recording head having, e.g., 256 nozzles, 512 nozzles, or 1,024 nozzles.

In this case, the number of print buffers whose contents can be simultaneously recorded is increased to 4, 8, or 16.

If, for example, a predetermined number or more of blocks exhibit effective pixel ratios exceeding a predetermined value, it suffices to print the contents of the corresponding print buffers by a plurality of scanning operations. In addition, in the embodiments, for the sake of descriptive convenience, one print buffer has a height of 64 dots. It is, however, apparent that the present invention is not limited to this. In each embodiment described above, since each print buffer is divided in the direction of the effective recording width of the recording head, recording can be separately performed by a plurality of scanning operations. However, the present invention can be applied to a case wherein each print head is divided only in the scanning direction.

The embodiments applied to the ink-jet printer have been mainly described above. As is apparent, however, the present invention is not limited to the ink-jet printer, and can be applied to a thermal printer as well.

Note that the ink-jet printer is described in more detail in, e.g., U.S. Ser. No. 120,346.

Figure 12:
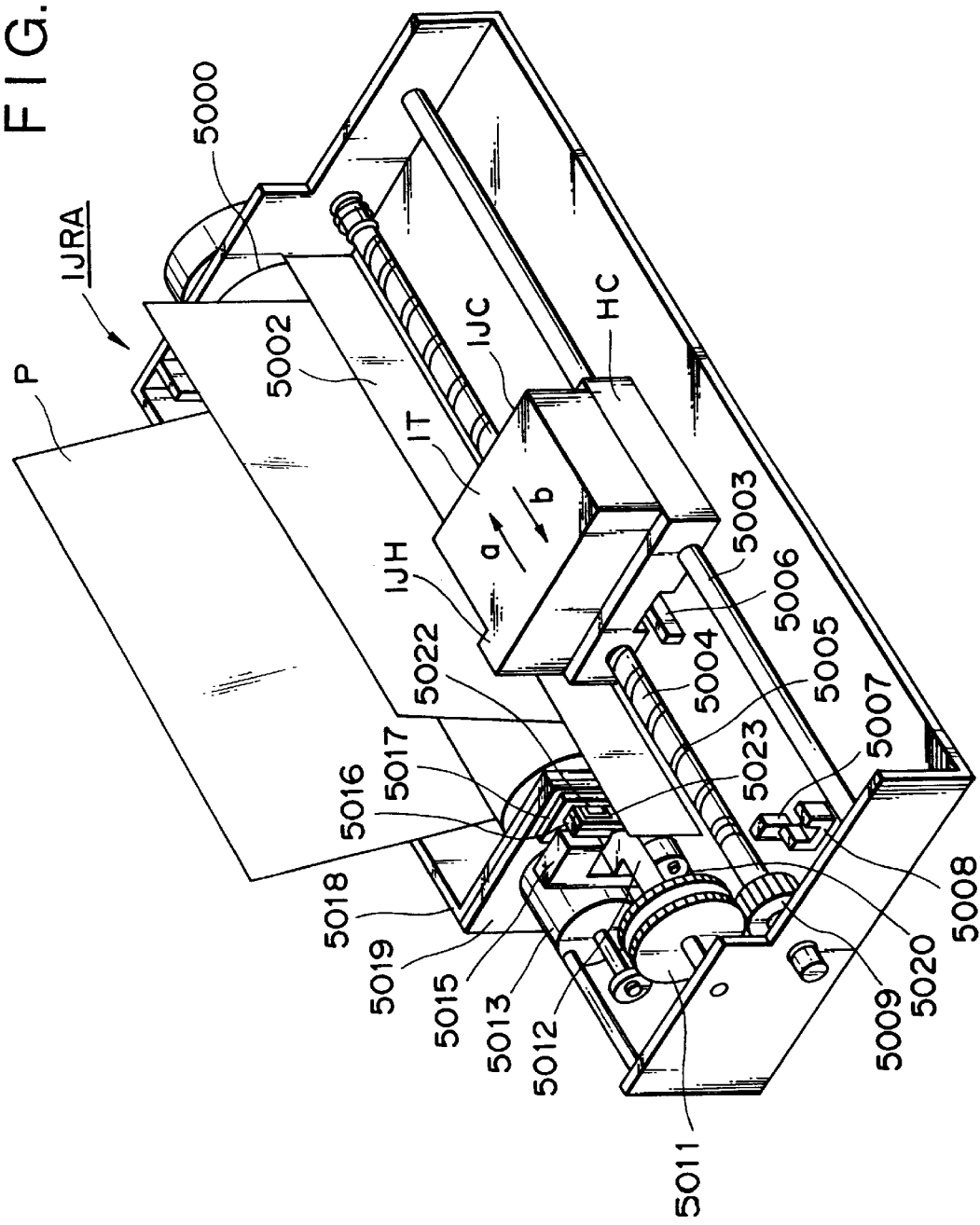
FIG. 12 is a schematic perspective view of an inkjet recording apparatus IJRA to which the present invention can be applied.

FIG. 12 is an external view of an ink-jet recording apparatus IJRA to which the present invention can be applied. In FIG. 12, a lead screw 5005 is rotated via driving-force transmission gears 5011 and 5009 in cooperation with the forward-reverse rotation of a driving motor 5013. A carriage HC, which is engaged with a spiral groove 5004 of the lead screw 5005, has a pin (not shown), and is reciprocally moved in the directions of arrows a and b. An ink-jet cartridge IJC is mounted on the carriage HC. Reference numeral 5002 denotes a sheet pressing plate, which presses a paper sheet against a platen 5000 across the moving direction of the carriage. Reference numerals 5007 and 5008 denote photocouplers, which constitute a home position detection means for confirming the presence of a lever 5006 of the carriage in the corresponding region, and, e.g., switching the rotational direction of the motor 5013. Reference numeral 5016 denotes a member for supporting a cap member 5022 for capping the front surface of the recording head; and 5015, a suction means for drawing the interior of the cap by suction. The suction means 5015 performs suction recovery of the recording head via an intra-cap opening 5023. Reference numeral 5017 denotes a cleaning blade; and 5019, a member for movably supporting the blade in the back-and-forth direction. These members are supported on a main body support plate 5018. The shape of the blade is not limited to the illustrated one, and a known cleaning blade can be applied to this embodiment, as a matter of course. Reference numeral 5012 denotes a lever for initiating the suction operation of the suction recovery operation. The lever 5012 moves upon movement of a cam 5020 engaged with the carriage, and its movement control is realized by a known transmission means such as clutch switching of the driving force from the driving motor.

These capping, cleaning, and suction recovery operations are executed at their corresponding positions upon operation of the lead screw 5005 when the carriage reaches a region at the side of the home position. However, the present invention is not limited to this as long as these operations are executed at known timings.

Figure 13:
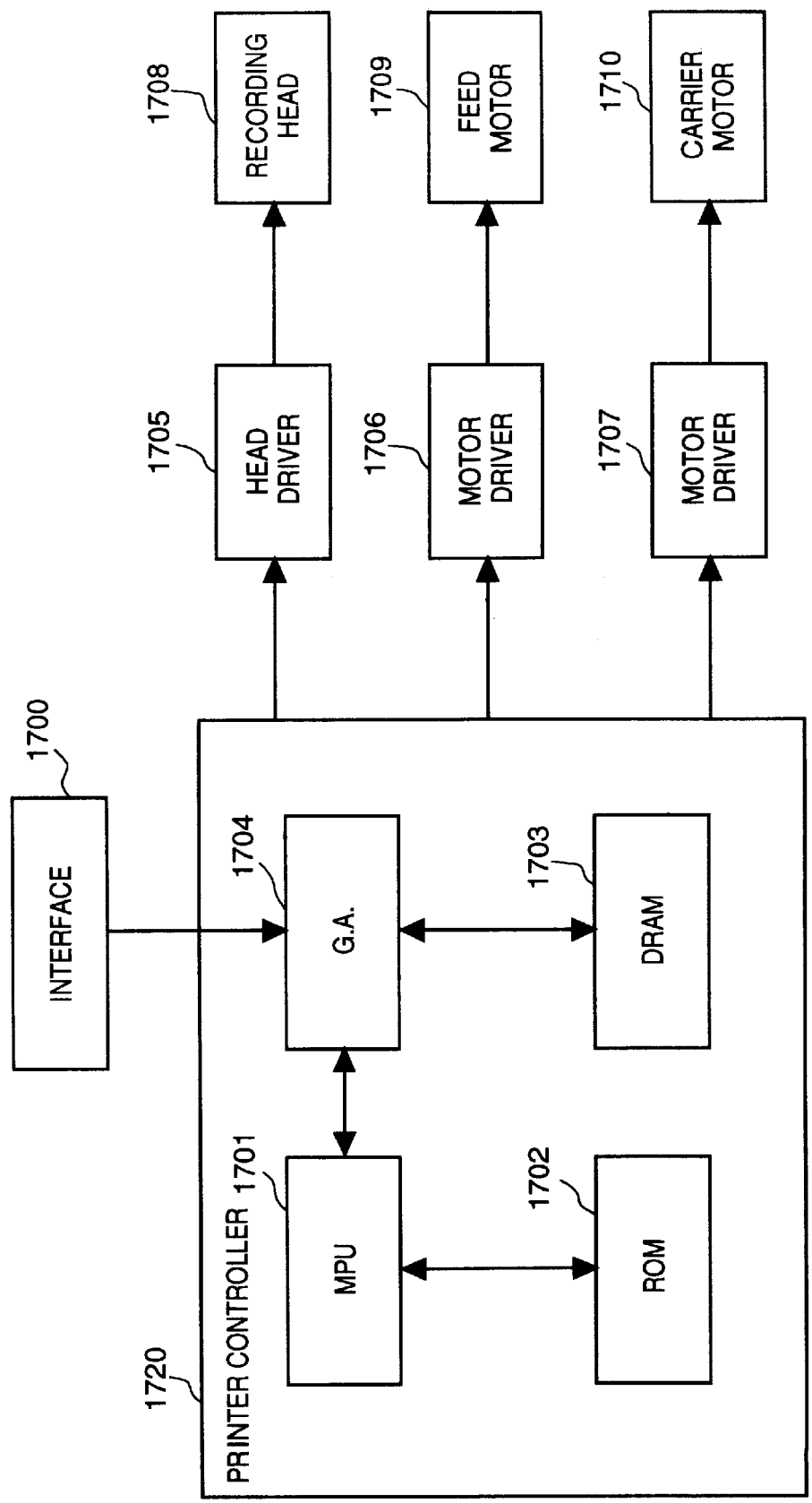
FIG. 13 is a block diagram showing the control arrangement for executing recording control of the recording apparatus IJRA.

The control arrangement for executing recording control of the above-mentioned apparatus will be described below with reference to the block diagram in FIG. 13. Referring to FIG. 13 showing a control circuit, reference numeral 1700 denotes an interface for inputting a recording signal; 1701, an MPU; 1702, a program ROM for storing control programs executed by the MPU 1701; and 1703, a dynamic RAM for storing various data (the recording signal, recording data to be supplied to the head, and the like). Reference numeral 1704 denotes a gate array for executing supply control of recording data to a recording head 1708, and also executing data transfer control among the interface 1700, the MPU 1701, and the DRAM 1703. Reference numeral 1710 denotes a carrier motor for feeding the recording head 1708; and 1709, a feed motor for feeding a recording paper sheet. Reference numeral 1705 denotes a head driver for driving the head; and 1706 and 1707, motor drivers for respectively driving the feed motor 1709 and the carrier motor 1710. Note that reference numeral 1720 denote a printer controller.

The operation of the above-mentioned control arrangement will be described below. When a recording signal is input to the interface 1700, the recording signal is converted into recording data for printing between the gate array 1704 and the MPU 1701. Then, the motor drivers 1706 and 1707 are driven, and the recording head is driven in accordance with the recording data supplied to the head driver 1705, thus executing the printing operation.

The present invention may be applied to a system constituted by a plurality of apparatuses and to an apparatus constituted by a single device. In addition, as is apparent, the present invention can be applied to a case wherein the above object can be achieved by supplying programs to a system or an apparatus.

As described above, according to the embodiments of the present invention, in a recording apparatus using an elongated recording head, before data is actually recorded on a recording sheet, the effective pixel ratios of a plurality of print buffers corresponding to drawing areas to be subjected to the next recording operation are checked, and print modes are variably controlled on the basis of the check result, thereby providing a recording method and apparatus which can use a low-power, low-cost power supply. In practice, therefore, an image having a low effective pixel ratio, e.g., a text, which exhibits a high frequency of occurrence, can be printed at a high speed by using all the recording elements of the elongated recording head, whereas a graphic or pictorial image having a high effective pixel ratio is printed by a plurality of scanning operations. That is, there are provided a recording method and apparatus which can flexibly perform recording processing in accordance with the characteristics of an image to be printed.

As has been described above, according to the present invention, print data can be printed at a high speed without using a large-capacity power supply.

As many apparently widely different embodiments of the present invention can be made without departing from the spirit and scope thereof, it is to be understood that the invention is not limited to the specific embodiments thereof except as defined in the appended claims.

What is claimed is:

1. An image recording apparatus for recording an image by sequentially scanning a recording head having a plurality of recording elements arrayed in a direction different from a convey direction of a recording medium, comprising:

count means for counting data to be actually printed in print data corresponding to each area obtained by dividing a recording area, which is an area recorded by scanning the recording head in a direction different from the convey direction of the recording medium, into a plurality of predetermined-size areas, and wherein the divided areas are divided in a direction of the width of said recording head; and selection means for selecting a recording mode based on a counting result from said count means of the data to be actually printed on a plurality of the divided areas, wherein said selection means selects either a first recording mode of selecting the use of a first number of recording elements of the recording head or a second recording mode of selecting the use of a second number of recording elements of the recording head based on the counting result, the first number being less than the second number.

2. The apparatus according to claim 1, wherein a print duty indicated by the counting result in the first recording mode is higher than a predetermined threshold value, while the print duty in the second recording mode is lower than the predetermined threshold value.

3. The apparatus according to claim 2, further comprising a carriage on which said recording head is detachably mounted.

4. The apparatus according to claim 1, wherein each of the divided area is obtained by dividing the recording area in a scanning direction of said recording head.

5. The apparatus according to claim 4, wherein each of the divided area is obtained by dividing the recording area in a direction of width of said recording head.

6. The apparatus according to claim 1, further comprising a power supply for supplying power to said image recording apparatus.

7. The apparatus according to claim 6, wherein said power supply utilizes switching technique.

8. The apparatus according to claim 6, wherein said power supply is of an AC scheme.

9. The apparatus according to claim 6, wherein said power supply is of a built-in type.

10. The apparatus according to claim 6, wherein said power supply is of an adaptor type.

11. The apparatus according to claim 1, further comprising convey means for conveying a recording medium on which data is recorded by said recording head.

12. The apparatus according to claim 1, wherein said image recording apparatus is provided in a copying machine.

13. The apparatus according to claim 1, wherein said image recording apparatus is provided in a FAX apparatus.

14. The apparatus according to claim 1, wherein said image recording apparatus is provided in a terminal of a computer.

15. The apparatus according to claim 1, wherein said recording head is an ink-jet recording head for recording an image by discharging an ink.

16. The apparatus according to claim 15, wherein said recording head is an ink-jet recording head for discharging an ink by using thermal energy, said ink-jet recording head having a thermal energy converter for generating thermal energy to be applied to the ink.

17. The apparatus according to claim 1, wherein said recording head is a thermal head.

18. An image recording method of recording an image by sequentially scanning a recording head having a plurality of recording elements arrayed in a direction different from a convey direction of a recording medium, comprising the steps of:

counting data to be actually printed in print data corresponding to each area obtained by dividing a recording area, which is an area recorded by scanning the recording head in a direction different from the convey direction of the recording medium, into a plurality of predetermined-size areas, wherein the divided areas are divided in a direction of the width of said recording head; and selecting a recording mode based on a counting result from said counting step of the data to be actually printed on a plurality of the divided areas, wherein said selecting step selects either a first recording mode of selecting the use of a first number of recording elements of the recording head or a second recording mode of selecting the use of a second number of recording elements of the recording head based on the counting result, the first number being less than the second number.

19. The method according to claim 18, wherein a print duty indicated by the counting result in the first recording mode is higher than a predetermined threshold value, while the print duty in the second recording mode is lower than the predetermined threshold value.

20. The method according to claim 18, wherein each of the divided areas is obtained by dividing the recording area in a direction of width of said recording head.

21. The method according to claim 20, wherein each of the divided areas is obtained by dividing the recording area in a scanning direction of said recording head.

22. The method according to claim 18, wherein said recording head is an ink-jet recording head for recording an image by discharging an ink.

23. The method according to claim 22, wherein said recording head is an ink-jet recording head for discharging an ink by using thermal energy, said ink-jet recording head having a thermal energy converter for generating thermal energy to be applied to the ink.

24. The method according to claim 18, wherein said recording head is a thermal head.

* * * * *

UNITED STATES PATENT AND TRADEMARK OFFICE
CERTIFICATE OF CORRECTION

PATENT NO. : 6,155,663
DATED : December 5, 2000
INVENTOR(S) : Yoshiaki Takayanagi It is certified that error appears in the above-identified patent and that said Letters Patent is hereby corrected as shown below:

Title page,
Item [56], References Cited, FOREIGN PATENT DOCUMENTS,
"3164266  7/1991  Japan" should read -- 3-164266  7/1991  Japan --;
"4353466  12/1991 Japan" should read -- 4-353466  12/1992 Japan --;and
"6143648  5/1994  Japan" should read -- 6-143648  5/1994  Japan --.

Column 1,
Line 35, "adapter-type of power" should read -- adapter type power --; and
Line 63, "parameter" should read -- parameters --.

Column 2,
Line 24, "The apparatus" should read -- This apparatus --.

Column 3,
Line 57, "sumption." should read -- consumption. --.

Column 4,
Line 43, "DC-DC converter" should read -- AC-DC converter --.

Column 5,
Line 5, "to for example" should read -- to, for example --.

UNITED STATES PATENT AND TRADEMARK OFFICE
CERTIFICATE OF CORRECTION

PATENT NO.    : 6,155,663
DATED         : December 5, 2000
INVENTOR(S)   : Yoshiaki Takayanagi It is certified that error appears in the above-identified patent and that said Letters Patent is hereby corrected as shown below:

<u>Column 9,</u>
Line 10, denote" should read -- denotes --; and
Line 61, "areas, and" should read -- areas, --.

<u>Column 12,</u>
Line 3, "direction of said" should read -- direction of width of said --.

Signed and Sealed this

Twenty-fifth Day of December, 2001

*Attest:*

*Attesting Officer*

JAMES E. ROGAN
*Director of the United States Patent and Trademark Office*